US012699772B2

(12) United States Patent
Manjhi et al.

(10) Patent No.: US 12,699,772 B2
(45) Date of Patent: Aug. 4, 2026

---

(54) ARTIFICIAL INTELLIGENCE CHATBOT FOR DATA PLATFORM SECURITY ANALYSIS

(71) Applicant: Cohesity, Inc., San Jose, CA (US)

(72) Inventors: Devesh Manjhi, Bengaluru (IN);
Sharan Harsoor, Bengaluru (IN);
Shobhit Shekhar, Bengaluru (IN);
Pramesh Gupta, Bengaluru (IN)

(73) Assignee: Cohesity, Inc., Santa Clara, CA (US)

( * ) Notice: Subject to any disclaimer, the term of this patent is extended or adjusted under 35 U.S.C. 154(b) by 0 days.

(21) Appl. No.: 18/957,307

(22) Filed: Nov. 22, 2024

(65) Prior Publication Data

US 2025/0284800 A1     Sep. 11, 2025

(30) Foreign Application Priority Data

Mar. 7, 2024    (IN) .............................. 202441016378

(51) Int. Cl.
*G06F 21/55* (2013.01)
*G06F 40/205* (2020.01)

(52) U.S. Cl.
CPC .......... *G06F 21/554* (2013.01); *G06F 21/552* (2013.01); *G06F 40/205* (2020.01)

(58) Field of Classification Search
CPC ..... G06F 21/554; G06F 40/205; G06F 21/552
USPC .......................................................... 726/27
See application file for complete search history.

(56) References Cited

U.S. PATENT DOCUMENTS

| | | | |
|---|---|---|---|
| 10,621,343 B1 * | 4/2020 | Maciejak .............. | G06F 21/562 |
| 12,001,549 B1 * | 6/2024 | Schindel .............. | G06F 21/554 |
| 12,368,745 B1 * | 7/2025 | Guo .................... | G06F 16/9024 |
| 2019/0104157 A1 * | 4/2019 | Filar ...................... | G06F 40/30 |
| 2019/0245878 A1 * | 8/2019 | Ward ..................... | H04L 63/20 |
| 2020/0320208 A1 * | 10/2020 | Bhosale ............... | G06F 21/577 |
| 2023/0308474 A1 * | 9/2023 | Thompson .......... | H04L 63/1416 |
| 2024/0037332 A1 * | 2/2024 | Narayan ................ | G06F 40/30 |
| 2024/0045990 A1 * | 2/2024 | Boyer ................ | G06F 21/6245 |
| 2024/0070270 A1 * | 2/2024 | Mace .................... | G06F 21/552 |
| 2024/0414107 A1 * | 12/2024 | Andrew .................. | H04L 51/02 |
| 2025/0077511 A1 * | 3/2025 | Zhao ................. | G06F 16/24522 |
| 2025/0110976 A1 * | 4/2025 | Channapattan ....... | G06F 40/205 |

(Continued)

OTHER PUBLICATIONS

Extended Search Report from counterpart European Application No. 25156743.4 dated Jul. 30, 2025, 12 pp.

(Continued)

*Primary Examiner* — Thanh T Le

(74) *Attorney, Agent, or Firm* — Shumaker & Sieffert, P.A.

(57) ABSTRACT

In general, techniques are described that enable a computing system to execute an artificial intelligence model for data security analysis. A computing system that includes a memory and processing circuitry may be configured to implement the techniques. The memory may store a query from an end user regarding security services provided by the data platform. The processing circuitry may parse the query to identify one or more intents, and process the one or more intents to retrieve data for formulating a natural language response to the query. The processing circuitry may also process, using a large language model, the intents and the data to generate the natural language response, and output the natural language response to a user interface for display to the end user.

18 Claims, 6 Drawing Sheets

(56)                References Cited

U.S. PATENT DOCUMENTS

2025/0217507 A1*  7/2025  Sandeep ................. H04L 51/02
2025/0284800 A1*  9/2025  Manjhi ................. G06F 40/205
2025/0335583 A1*  10/2025  Varanasi .............. G06F 21/554

OTHER PUBLICATIONS

Kaheh et al., "Cyber Sentinel: INV. Exploring Conversational Agents in G06F21/55 Streamlining Security Tasks with GPT-4", arXiv: 2309.16422v1, Sep. 28, 2023, 10 pp.
Response to Extended Search Report dated Jul. 30, 2025, from counterpart European Application No. 25156743.4 filed Mar. 9, 2026, 29 pp.

* cited by examiner

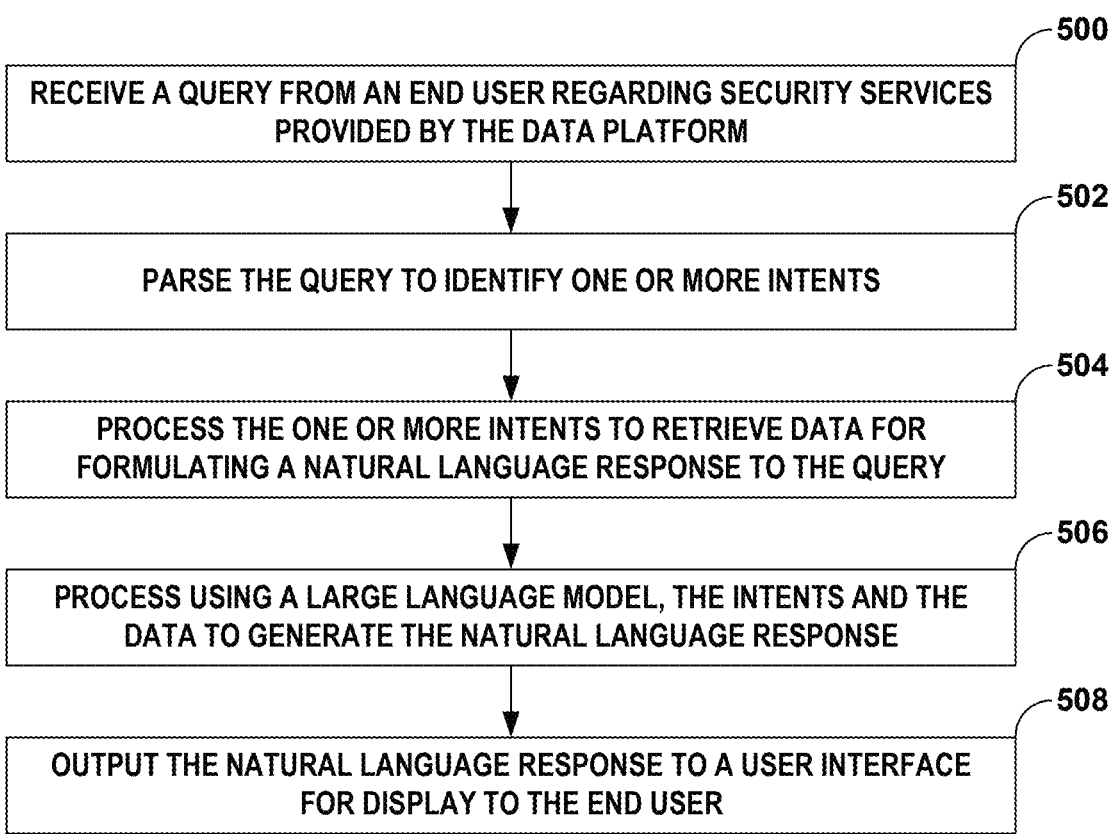

500
RECEIVE A QUERY FROM AN END USER REGARDING SECURITY SERVICES PROVIDED BY THE DATA PLATFORM

502
PARSE THE QUERY TO IDENTIFY ONE OR MORE INTENTS

504
PROCESS THE ONE OR MORE INTENTS TO RETRIEVE DATA FOR FORMULATING A NATURAL LANGUAGE RESPONSE TO THE QUERY

506
PROCESS USING A LARGE LANGUAGE MODEL, THE INTENTS AND THE DATA TO GENERATE THE NATURAL LANGUAGE RESPONSE

508
OUTPUT THE NATURAL LANGUAGE RESPONSE TO A USER INTERFACE FOR DISPLAY TO THE END USER

FIG. 5

ARTIFICIAL INTELLIGENCE CHATBOT FOR DATA PLATFORM SECURITY ANALYSIS

RELATED APPLICATIONS

This application claims the benefit of India Provisional Patent Application No. 202441016378, filed 7 Mar. 2024, the entire content of which is incorporated herein by reference.

TECHNICAL FIELD

This disclosure relates to data platforms for computing systems.

BACKGROUND

Data platforms that support computing applications rely on primary storage systems to support latency sensitive applications. However, because primary storage is often more difficult or expensive to scale, a secondary storage system is often relied upon to support secondary use cases such as backup and archive.

A file system snapshot is a point-in-time copy or representation of the entire file system or a specific subset of it. A snapshot captures the state of files and directories at a particular moment, providing a snapshot of the file system data as it existed at that specific point. File system snapshots are often used for backup and recovery purposes and can offer benefits in terms of data protection and system consistency. The file system data can include file system objects (e.g., files, directories), metadata, or both.

The data platform may provide security services that identify security breaches (e.g., ransomware, malware, intrusion detection, etc.) with respect to the file system. The data platform may execute multiple different microservices to support security breach identification and analysis. It may be difficult to summarize and explain the security breaches, making it difficult for end users to identify security risks due to the large number of security related microservices.

SUMMARY

Aspects of this disclosure describe techniques for an artificial intelligence chatbot for data platform security analysis. Rather than resort to keyword searches with respect to each of the multiple different security microservices in an attempt to summarize security breaches in the data platform system wide, the data platform may support execution of a chatbot that relies on artificial intelligence in the form of a trained large language model (LLM), which is trained with respect to a general security knowledge base, a data platform security specific knowledge base (e.g., documentation regarding security services provided by the data platform), account-specific security knowledge base (e.g., logs and/or other data reflective of security breaches for a specific account associated with an end user), and other security adjacent knowledge bases.

The end user may interact with the chatbot using natural language to enter queries (e.g., voice-to-text, text chat messages, etc.), which the chatbot backend executed by the data platform may process to derive intents. Based on the intents, the data platform may retrieve security data from the general security knowledge base, the data platform specific knowledge base, the account-specific security knowledge base, and/or other security adjacent knowledge bases. The data platform may invoke the LLM providing the intents and the security data retrieved from the various knowledge bases, where the LLM may formulate, based on the intents and the security data, a natural language response. The chatbot backend executed by the data platform may then output the natural language response to the chatbot user interface executed locally at the remote end user system.

The techniques of this disclosure may provide one or more technical advantages that realize one or more practical applications. By avoiding complicated key word searches that may require extensive understanding of the underlying security microservices, the chatbot user interface supported by the LLM executed by the data platform (and assisted by the chatbot backend) may answer general security questions (e.g., "What is ransomware?") while also providing specific answers to security questions specific to the underlying data platform (e.g., "How do I configure security analysis for ransomware?") and specific answers relevant to the security breaches experienced by the end user account (e.g., "How many security incidents over the threshold have we experienced this year?"). By avoiding unnecessary complexity in providing this security analysis, the end user may more quickly understand and identify security breaches for an underlying file system protected by the data platform, which may improve the user experience while also reducing an amount of computing resources (e.g., in terms of processing cycles, memory space, memory bus bandwidth, etc. along with power consumption) consumed due to the more efficient and natural response to queries that do not rely on complicated keyword searches specific to a given security microservice. The unification of multiple knowledge bases via the LLM may also promote more comprehensive answers that require less investigation (and associated time) by the end user while also promoting a quicker understanding of the security risks to the underlying file system protected by the data platform.

In one example, various aspects of the techniques may be directed to a method comprising: receiving, by a data platform, a query from an end user regarding security services provided by the data platform; parsing, by the data platform, the query to identify one or more intents; processing, by the data platform, the one or more intents to retrieve data for formulating a natural language response to the query; processing, by the data platform, using a large language model, the intents and the data to generate the natural language response; and outputting, by the data platform, the natural language response to a user interface for display to the end user.

In another example, various aspects of the techniques may be directed to a computing system that implements a data platform, the computing system comprising: a memory configured to store a query from an end user regarding security services provided by the data platform; and processing circuitry configured to: parse the query to identify one or more intents; process the one or more intents to retrieve data for formulating a natural language response to the query; process, using a large language model, the intents and the data to generate the natural language response; and output the natural language response to a user interface for display to the end user.

In another example, various aspects of the techniques may be directed to non-transitory computer-readable storage media having instructions stored thereon that, when executed, cause one or more processors to: obtain a query from an end user regarding security services provided by the data platform; parse the query to identify one or more intents; process the one or more intents to retrieve data for formulating a natural language response to the query; process, using a large language model, the intents and the data to generate the natural language response; and output the natural language response to a user interface for display to the end user.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

FIG. 5 is another flowchart illustrating example operation of the system shown in FIGS. 1A-3 in performing various aspects of the artificial intelligence chatbot configured to perform the security analysis techniques described in this disclosure.

Like reference characters denote like elements throughout the text and figures.

DETAILED DESCRIPTION

Figure 1A:
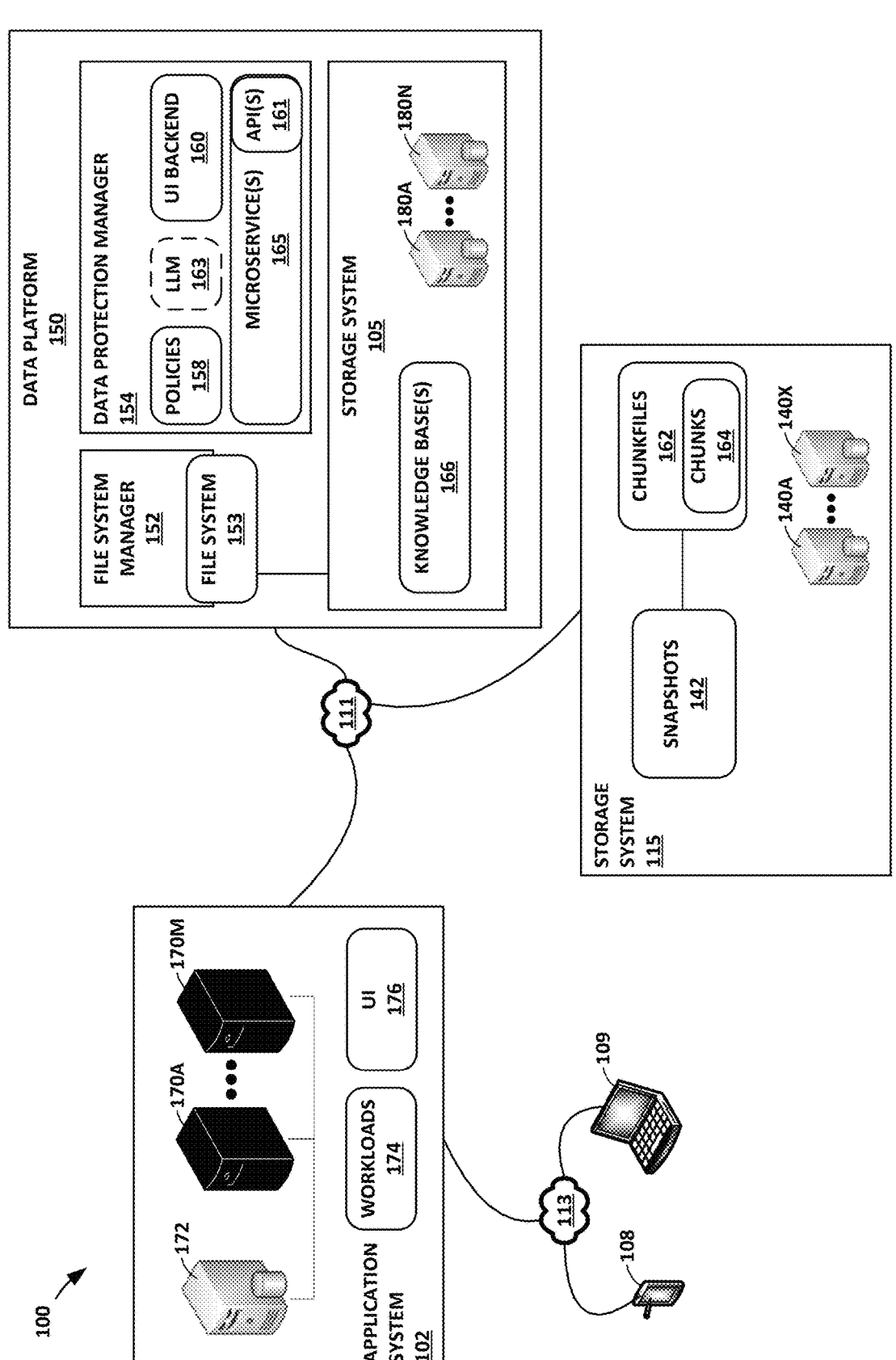
FIGS. 1A-1B are block diagrams illustrating example systems configured to support execution of an artificial intelligence chatbot that performs security analysis, in accordance with one or more aspects of the techniques described in this disclosure.
Figure 1B:
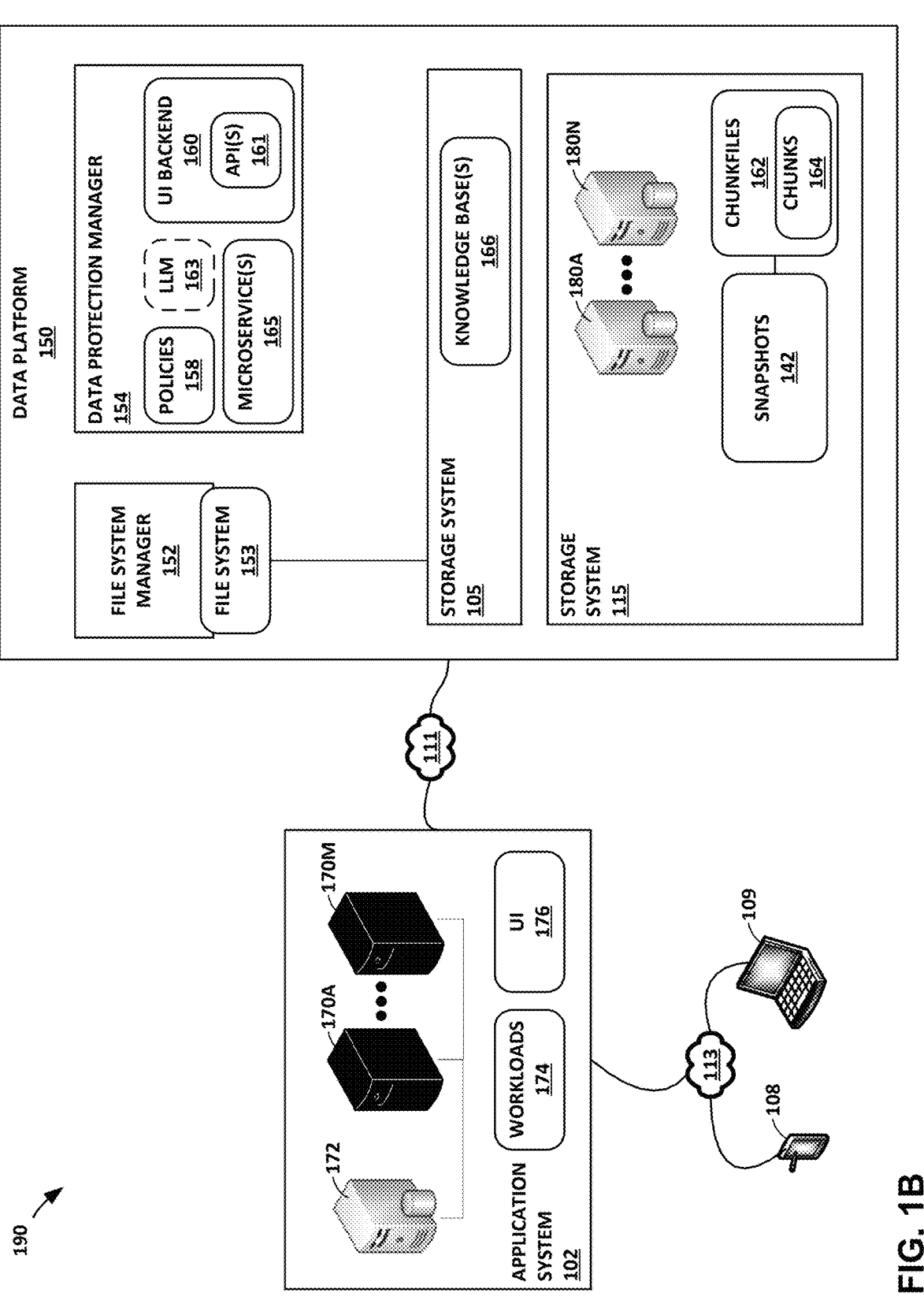

FIGS. 1A-1B are block diagrams illustrating example systems configured to support execution of an artificial intelligence chatbot that performs security analysis, in accordance with one or more aspects of the techniques described in this disclosure. In the example of FIG. 1A, system 100 includes application system 102. Application system 102 represents a collection of hardware devices, software components, and/or data stores that can be used to implement one or more applications or services provided to one or more mobile devices 108 and one or more client devices 109 via a network 113. Application system 102 may include one or more physical or virtual computing devices that execute workloads 174 for the applications or services. Workloads 174 may include one or more virtual machines, containers, Kubernetes pods each including one or more containers, bare metal processes, and/or other types of workloads.

In the example of FIG. 1A, application system 102 includes application servers 170A-170M (collectively, "application servers 170") connected via a network with database server 172 implementing a database. Other examples of application system 102 may include one or more load balancers, web servers, network devices such as switches or gateways, or other devices for implementing and delivering one or more applications or services to mobile devices 108 and client devices 109. Application system 102 may include one or more file servers. The one or more file servers may implement a primary file system for application system 102. (In such instances, file system 153 may be a secondary file system that provides backup, archive, and/or other services for the primary file system. Reference herein to a file system may include a primary file system or secondary file system, e.g., a primary file system for application system 102 or file system 153 operating as either a primary file system or a secondary file system.)

Application system 102 may be located on premises and/or in one or more data centers, with each data center a part of a public, private, or hybrid cloud. The applications or services may be distributed applications. The applications or services may support enterprise software, financial software, office or other productivity software, data analysis software, customer relationship management, web services, educational software, database software, multimedia software, information technology, health care software, or other type of applications or services. The applications or services may be provided as a service (-aaS) for Software-aaS (SaaS), Platform-aaS (PaaS), Infrastructure-aaS (IaaS), Data Storage-aas (dSaaS), or other type of service.

In some examples, application system 102 may represent an enterprise system that includes one or more workstations in the form of desktop computers, laptop computers, mobile devices, enterprise servers, network devices, and other hardware to support enterprise applications. Enterprise applications may include enterprise software, financial software, office or other productivity software, data analysis software, customer relationship management, web services, educational software, database software, multimedia software, information technology, health care software, or other type of applications. Enterprise applications may be delivered as a service from external cloud service providers or other providers, executed natively on application system 102, or both.

In the example of FIG. 1A, system 100 includes a data platform 150 that provides a file system 153 and archival functions to an application system 102, using storage system 105 and separate storage system 115. Data platform 150 implements a distributed file system 153 and a storage architecture to facilitate access by application system 102 to file system data and to facilitate the transfer of data between storage system 105 and application system 102 via network 111. With the distributed file system, data platform 150 enables devices of application system 102 to access file system data, via network 111 using a communication protocol, as if such file system data was stored locally (e.g., to a hard disk of a device of application system 102). Example communication protocols for accessing files and objects include Server Message Block (SMB), Network File System (NFS), or AMAZON Simple Storage Service (S3). File system 153 may be a primary file system or secondary file system for application system 102.

File system manager 152 represents a collection of hardware devices and software components that implements file system 153 for data platform 150. Examples of file system functions provided by the file system manager 152 include storage space management including deduplication, file naming, directory management, metadata management, partitioning, and access control. File system manager 152 executes a communication protocol to facilitate access via network 111 by application system 102 to files and objects stored to storage system 105.

Data platform 150 includes storage system 105 having one or more storage devices 180A-180N (collectively, "storage devices 180"). Storage devices 180 may represent one or more physical or virtual compute and/or storage devices that include or otherwise have access to storage media. Such storage media may include one or more of Flash drives, solid state drives (SSDs), hard disk drives (HDDs), forms of electrically programmable memories (EPROM) or electrically erasable and programmable (EEPROM) memories, and/or other types of storage media used to support data platform 150. Different storage devices of storage devices 180 may have a different mix of types of storage media. Each of storage devices 180 may include system memory. Each of storage devices 180 may be a storage server, a network-attached storage (NAS) device, or may represent disk storage for a compute device. Storage system 105 may be a redundant array of independent disks (RAID) system. In some examples, one or more of storage devices 180 are both compute and storage devices that execute software for data platform 150, such as file system manager 152 and data protection manager 154 in the example of system 100. In some examples, separate compute devices (not shown) execute software for data platform 150, such as file system manager 152 and data protection manager 154 in the example of system 100. Each of storage devices 180 may be considered and referred to as a "storage node" or simply as a "node". Storage devices 180 may represent virtual machines running on a supported hypervisor, a cloud virtual machine, a physical rack server, or a compute model installed in a converged platform.

In various examples, data platform 150 runs on physical systems, virtually, or natively in the cloud. For instance, data platform 150 may be deployed as a physical cluster, a virtual cluster, or a cloud-based cluster running in a private, hybrid private/public, or public cloud deployed by a cloud service provider. In some examples of system 100, multiple instances of data platform 150 may be deployed, and file system 153 may be replicated among the various instances. In some cases, data platform 150 is a compute cluster that represents a single management domain. The number of storage devices 180 may be scaled to meet performance needs.

Data platform 150 may implement and offer multiple storage domains to one or more tenants or to segregate workloads 174 that require different data policies. A storage domain is a data policy domain that determines policies for deduplication, compression, encryption, tiering, and other operations performed with respect to objects stored using the storage domain. In this way, data platform 150 may offer users the flexibility to choose global data policies or workload specific data policies. Data platform 150 may support partitioning.

A view is a protocol export that resides within a storage domain. A view inherits data policies from its storage domain, though additional data policies may be specified for the view. Views can be exported via SMB, NFS, S3, and/or another communication protocol. Policies that determine data processing and storage by data platform 150 may be assigned at the view level. A protection policy may specify a backup frequency and a retention policy, which may include a data lock period. Snapshots 142 or archives created in accordance with a protection policy inherit the data lock period and retention period specified by the protection policy.

Each of network 113 and network 111 may be the internet or may include or represent any public or private communications network or other network. For instance, network 113 may be a cellular, Wi-Fi®, ZigBee®, Bluetooth®, Near-Field Communication (NFC), satellite, enterprise, service provider, and/or other type of network enabling transfer of data between computing systems, servers, computing devices, and/or storage devices. One or more of such devices may transmit and receive data, commands, control signals, and/or other information across network 113 or network 111 using any suitable communication techniques. Each of network 111 or network 113 may include one or more network hubs, network switches, network routers, satellite dishes, or any other network equipment. Such network devices or components may be operatively inter-coupled, thereby providing for the exchange of information between computers, devices, or other components (e.g., between one or more client devices or systems and one or more computer/server/storage devices or systems). Each of the devices or systems illustrated in FIGS. 1A-1B may be operatively coupled to network 111 and/or network 113 using one or more network links. The links coupling such devices or systems to network 111 and/or network 113 may be Ethernet, Asynchronous Transfer Mode (ATM) or other types of network connections, and such connections may be wireless and/or wired connections. One or more of the devices or systems illustrated in FIGS. 1A-1B or otherwise on network 111 and/or network 113 may be in a local location and/or a remote location relative to one or more other illustrated devices or systems.

Application system 102, using file system 153 provided by data platform 150, generates objects and other data that file system manager 152 creates, manages, and causes to be stored to storage system 105. For this reason, application system 102 may alternatively be referred to as a "source system," and file system 153 for application system 102 may alternatively be referred to as a "source file system." Application system 102 may for some purposes communicate directly with storage system 105 via network 111 to transfer objects, and for some purposes communicate with file system manager 152 via network 111 to obtain objects or metadata indirectly from storage system 105. File system manager 152 generates and stores metadata to storage system 105. The collection of data stored to storage system 105 and used to implement file system 153 is referred to herein as file system data. File system data may include the aforementioned metadata and objects. Metadata may include file system objects, tables, trees, or other data structures; metadata generated to support deduplication; or metadata to support snapshots. As shown in the example of FIG. 1A for instance, storage system 105 may store metadata for file system 153 in a tree data structure. Objects that are stored may include files, virtual machines, databases, applications, pods, container, any of workloads 174, system images, directory information, or other types of objects used by application system 102. Objects of different types and objects of a same type may be deduplicated with respect to one another.

Data platform 150 includes data protection manager 154 that provides backups of file system data for file system 153. In the example of system 100, data protection manager 154 stores one or more backups or snapshots 142 of file system data, stored by storage system 105, to storage system 115 via network 111.

Storage system 115 includes one or more storage devices 140A-140X (collectively, "storage devices 140"). Storage devices 140 may represent one or more physical or virtual compute and/or storage devices that include or otherwise have access to storage media. Such storage media may include one or more of Flash drives, solid state drives (SSDs), hard disk drives (HDDs), optical discs, forms of electrically programmable memories (EPROM) or electrically erasable and programmable (EEPROM) memories, and/or other types of storage media. Different storage devices of storage devices 140 may have a different mix of types of storage media. Each of storage devices 140 may include system memory. Each of storage devices 140 may be a storage server, a network-attached storage (NAS) device, or may represent disk storage for a compute device. Storage system 115 may include redundant array of independent disks (RAID) system. Storage system 115 may be capable of storing much larger amounts of data than storage system 105. Storage devices 140 may further be configured for long-term storage of information more suitable for archival purposes.

In some examples, storage system 105 and/or 115 may be a storage system deployed and managed by a cloud storage provider and referred to as a "cloud storage system." Example cloud storage providers include, e.g., AMAZON WEB SERVICES (AWS™) by AMAZON, INC., AZURE® by MICROSOFT, INC., DROPBOX™ by DROPBOX, INC., ORACLE CLOUD™ by ORACLE, INC., and GOOGLE CLOUD PLATFORM (GCP) by GOOGLE, INC. In some examples, storage system 115 is co-located with storage system 105 in a data center, on-prem, or in a private, public, or hybrid private/public cloud. Storage system 115 may be considered a "backup" or "secondary" storage system for primary storage system 105. Storage system 115 may be referred to as an "external target" for snapshots 142. Where deployed and managed by a cloud storage provider, storage system 115 may be referred to as "cloud storage." Storage system 115 may include one or more interfaces for managing transfer of data between storage system 105 and storage system 115 and/or between application system 102 and storage system 115. Data platform 150 that supports application system 102 relies on primary storage system 105 to support latency sensitive applications. However, because storage system 105 is often more difficult or expensive to scale, data platform 150 may use secondary storage system 115 to support secondary use cases such as backup, snapshot, and archive. In general, a file system backup or snapshot 142 is a copy of file system 153 to support protection of file system 153 for quick recovery, often due to some data loss in file system 153, and a file system archive ("archive") is a copy of file system 153 to support longer term retention and review. The "copy" of file system 153 may include such data as is needed to restore or view file system 153 in its state at the time of the backup or archive.

Data protection manager 154 may backup file system data for file system 153 at any time in accordance with backup policies 158 that specify, for example, backup periodicity and timing (daily, weekly, etc.), which file system data is to be backed up, a backup retention period, storage location, access control, and so forth. An initial backup of file system data corresponds to a state of the file system data at an initial backup time (the backup creation time of the initial backup). The initial backup may include a full backup of the file system data or may include less than a full backup of the file system data, in accordance with backup policies. For example, the initial backup may include all objects of file system 153 or one or more selected objects of file system 153.

One or more subsequent incremental backups of the file system 153 may correspond to respective states of the file system 153 at respective subsequent backup creation times, i.e., after the backup creation time corresponding to the initial backup. A subsequent backup may include an incremental backup of file system 153. A subsequent backup may correspond to an incremental backup of one or more objects of file system 153. Some of the file system data for file system 153 stored on storage system 105 at the initial backup creation time may also be stored on storage system 105 at the subsequent backup creation times. A subsequent incremental backup may include data that was not previously stored in a backup at storage system 115. File system data that is included in a subsequent backup may be deduplicated by data protection manager 154 against file system data that is included in one or more previous backups, including the initial backup, to reduce the amount of storage used. (Reference to a "time" in this disclosure may refer to dates and/or times. Times may be associated with dates. Multiple backups may occur at different times on the same date, for instance.)

In system 100, data protection manager 154 stores backups of file system data to storage system 115 as snapshots 142, using chunkfiles 162. Data protection manager 154 may use any of snapshots 142 to subsequently restore the file system (or portion thereof) to its state at the snapshot creation time, or the snapshot may be used to create or present a new file system (or "view") based on the snapshot, for instance. As noted above, data protection manager 154 may deduplicate file system data included in a subsequent snapshot against file system data that is included in one or more previous snapshots. For example, a second object of file system 153 included in a second snapshot may be deduplicated against a first object of file system 153 and included in a first, earlier snapshot. Data protection manager 154 may remove a data chunk ("chunk") of the second object and generate metadata with a reference (e.g., a pointer) to a stored chunk of chunks 164 in one of chunkfiles 162. The stored chunk in this example is an instance of a chunk stored for the first object.

Data protection manager 154 may apply deduplication as part of a write process of writing (i.e., storing) an object of file system 153 to one of snapshots 142 in storage system 115. Deduplication may be implemented in various ways. For example, the approach may be fixed length or variable length, the block size for the file system may be fixed or variable, and deduplication domains may be applied globally or by workload. Fixed length deduplication involves delimiting data streams at fixed intervals. Variable length deduplication involves delimiting data streams at variable intervals to improve the ability to match data, regardless of the file system block size approach being used. This algorithm is more complex than a fixed length deduplication algorithm but can be more effective for most situations and generally produces less metadata. Variable length deduplication may include variable length, sliding window deduplication. The length of any deduplication operation (whether fixed length or variable length) determines the size of the chunk being deduplicated.

In some examples, the chunk size can be within a fixed range for variable length deduplication. For instance, data protection manager 154 can compute chunks having chunk sizes within the range of 16-48 KB. Data protection manager 154 may eschew deduplication for objects that that are less than 16 kB. In some example implementations, when data of an object is being considered for deduplication, data protection manager 154 compares a chunk identifier (ID) (e.g., a hash value of the entire chunk) of the data to existing chunk IDs for already stored chunks. If a match is found, data protection manager 154 updates metadata for the object to point to the matching, already stored chunk. If no matching chunk is found, data protection manager 154 writes the data of the object to storage as one of chunks 164 for one of chunkfiles 162. Data protection manager 154 additionally stores the chunk ID in chunk metadata, in association with the new stored chunk, to allow for future deduplication against the new stored chunk. In general, chunk metadata is usable for generating, viewing, retrieving, or restoring objects stored as chunks 164 (and references thereto) within chunkfiles 162, for any of snapshots 142, and is described in further detail below.

Each of chunkfiles 162 includes multiple chunks 164. Chunkfiles 162 may be fixed size (e.g., 8 MB) or variable size. Chunkfiles 162 may be stored co-located with snapshot metadata, such as a tree data structure. In some cases, chunkfiles 162 may be stored using a data structure offered by a cloud storage provider for storage system 115. For example, each of chunkfiles 162 may be one of an S3 object within an AWS cloud bucket, an object within AZURE Blob Storage, an object in Object Storage for ORACLE CLOUD, or other similar data structure used within another cloud storage provider storage system.

The process of deduplication for multiple objects over multiple snapshots results in chunkfiles 162 that each have multiple chunks 164 for multiple different objects associated with the multiple snapshots. In some examples, different snapshots 142 may have objects that are effectively copies of the same data, e.g., for an object of the file system that has not been modified. An object of a snapshot may be represented or "stored" as metadata having references to chunks that enable the object to be accessed. Accordingly, description herein to a snapshot 142 "storing," "having," or "including" an object includes instances in which the snapshot does not store the data for the object in its native form.

An end user or application associated with application system 102 may have access (e.g., read or write) to data that is stored in storage system 115. The end user or application may delete some of the data due to a malicious attack (e.g., virus, ransomware, etc.), a rogue or malicious administrator, and/or human error. The user's credentials may be compromised and as a result, the data that is stored in storage system 115 may be subject to ransomware. To reduce the likelihood of accidental or malicious data deletion or corruption, a data lock having a data lock period may be applied to a snapshot.

As described above, chunkfiles 162 may represent an object in a snapshot storage system (shown as "storage system 115," which may also be referred to as "snapshot storage system 115") that conform to an underlying architecture of snapshot storage system 115. Data platform 150 includes data protection manager 154 that supports archiving of data in the form of chunkfiles 162, which interface with snapshot storage system 115 to store chunkfiles 162 after forming chunkfiles 162 from one or more chunks 164 of data. Data protection manager 154 may apply a process referred to as "deduplication" with respect to chunks 164 to remove redundant chunks and generate metadata linking redundant chunks to previously stored chunks 164 and thereby reduce storage consumed (and thereby reduce storage costs in terms of storage required to store the chunks).

In addition, data protection manager 154 may apply security services in the form of one or more security microservices 165 ("microservices 165") that analyze file system 153, snapshots 142, etc. to identify security breaches, including one or more of a ransomware attack, a malware attack, an unauthorized data access, and a presence of malicious code. Microservices 165 may each provide a dedicated security analysis function that allows the end user to perform keyword searches in an attempt to summarize security breaches identified by the respective one of microservices 165. This results in the end user having to enter keyword searches specific to the underlying one of microservices 165, which may require dedicated end user understanding of each one of microservices 165. As a result, the end user may often have to perform multiple keyword searches and manually summarize security breaches, which frustrates end users and may result in the end user contacting support staff for the underlying data platform, e.g., data platform 150. The end user may waste computing resources both locally (e.g., at application system 102) and data platform 150 attempting to better understand the security breaches impacting file system 153 (e.g., especially in the form of ransomware, which may lock files stored to snapshots 142 and prevent successful restores of snapshots 142).

In accordance with various aspects of the techniques described in this disclosure, data platform 150 may support execution of a chatbot that relies on artificial intelligence in the form of a trained large language model (LLM) 163, which is trained with respect to a general security knowledge base, a data platform security specific knowledge base (e.g., documentation regarding security services provided by the data platform), account-specific security knowledge base (e.g., logs and/or other data reflective of security breaches for a specific account associated with an end user), and other security adjacent knowledge bases. The knowledge bases are shown in the example of FIG. 1A as knowledge bases 166, which LLM 163 may reference in various ways to obtain security data (either general, specific, and/or account-specific) that may form the basis of a natural language response to natural language queries entered by the end user. A chatbot is a conversational assistant that uses an artificial intelligence or other machine learning model to engage with a user or agent using, in many examples, natural language prompts/queries and responses. Although primarily described herein as a text-based interface or graphical user interface, chatbot techniques described herein may be alternatively or additionally implemented as a voice-activated interface, embedded interface, or multimodal interface.

While shown as including LLM 163 locally, data protection manager 154 may instead interface with a remote LLM and LLM 163 may represent an application programming interface (API) for the remote LLM, which data protection manager 154 may invoke to interface with the remote LLM. In addition, while described herein with respect to a local LLM 163, LLM 163 may represent any form of trained machine learning (ML) model and/or trained artificial intelligence (AI) model. Various form of trained ML models and/or trained AI models may include a neural network, a deep learning model, a support vector machine, or any other trained ML model and/or trained AI model that is capable of processing data to output a natural language response, as described in more detail below. A trained ML model and/or trained AI model ("trained AI/ML model") may refer to a AI/ML model that is trained either via supervised training, unsupervised training, or some combination of supervised and unsupervised training.

In the context of training a AI/ML model, supervised training refers to an annotated training set that is annotated or labeled (e.g., often by way of manual annotations) to identify the correct output that should be output by the AI/ML model and thereby guides or supervises the training. The training set usually refers to a large collection of example reference data, which may also include the annotations (or, in other words, labels) identifying the correct output. Unsupervised training refers to a training set that is not annotated, whereby the training of the AI/ML model occurs without human supervision.

In any event, the end user may interact with a chatbot via user interface ("UI") 176 ("UI 176") using natural language to enter queries (e.g., voice-to-text, text chat messages, etc.), which a chatbot backend 160 (which is shown in the example of FIG. 1A as "UI backend 160") executed by data protection manager 154 may process to derive intents. UI 176 may represent a web browser interface, command line interface, graphical user interface, a voice interface, etc. Based on the intents, data protection manager 154 may retrieve security data from the general security knowledge base, the data platform specific knowledge base, the account-specific security knowledge base, and/or other security adjacent knowledge bases (shown as knowledge bases 166). Data protection manager 154 may invoke LLM 163, providing the intents and the security data retrieved from various knowledge bases 166, where LLM 163 may formulate, based on the intents and the security data, a natural language response. Chatbot backend 160 executed by the data platform may then output the natural language response to chatbot user interface 176 executed locally at the remote end user system (shown as application system 102).

In operation, data platform 150 may invoke data protection manager 154 to perform data backups (e.g., shown as snapshots 142), which may involve invoking security microservices 165 to perform a security analysis of snapshots 142 to identify security breaches in the form of ransomware attacks, malware attacks, the presence of malicious code (e.g., a virus, a trojan horse, etc.), and the like. Microservices 165 may generate logs having entries identifying security breaches (e.g., a time of the security breach, a date of the security breach, a type of the security breach, etc.). Microservices 165 may store these logs as part of an account-specific knowledge base of knowledge bases 166. Knowledge bases 166 may also include a general security knowledge base providing general information regarding different security breaches, a security knowledge base specific to data platform 150 (e.g., defining information and/or data related to security services specific to data platform 150 and more specifically security services supported by security microservices 165), and account-specific security knowledge bases providing specific security breach information and/or data related to security breaches occurring at the particular end user (associated with application system 102 in the example of FIG. 1A).

Microservices 165 may expose application programming interfaces (APIs) 161, which UI backend 160 may invoke to query microservices 165 and obtain access to the underlying security logs having entries that identify each respective security breach. The end user may interact with UI 176, which presents a chatbot interface with which the end user may interact to input a natural language query regarding security breaches (either generally—e.g., "What is ransomware?," specifically—e.g., "How do I configure the data platform to implement ransomware detection?," and/or account-specifically—e.g., "How many security breaches above the threshold have been detected for my file system?"). Data protection manager 154 may execute or otherwise invoke UI backend 160, which receives the query from the end user regarding security services provided by data platform 150.

UI backend 160 may parse the query to identify one or more intents. UI backend 160 may parse the query according to extensible descriptors that configure UI backend 160 to parse intents from the query. UI backend 160 may then process the one or more intents to retrieve security data for formulating a natural language response to the query. UI backend 160 may, when the query comprises a general query regarding the security services provided by data platform 150, parse the general query to identify a general intent of the general query. UI backend 160 may process the one or more intents to access a general knowledge base of general knowledge bases 166 responsive to identifying the general intent to retrieve general data response to the general query. The general data (which may be referred to as "general query data") may relate to security of file system 153 protected by data platform 150.

In some instances, the query comprises a specific query regarding the security services provided by data platform 150. UI backend 160 may parse the specific query to identify a specific intent of the specific query, and access a specific knowledge base of knowledge bases 166 (which may include the most recently updated support documentation provided by data platform 150) responsive to identifying the specific intent to retrieve specific data responsive to the specific query. The specific data comprises documentation for managing security (e.g., in the form of security services supported by microservices 165) provided by data platform 150.

In yet other instances, the query comprises an account specific query regarding an account maintained by data platform 150 for the particular end user. UI backend 160 may parse the account specific query to identify an account specific intent of the account specific query, and access an account specific knowledge base of knowledge bases 166 responsive to identifying the account specific intent to retrieve security-specific data for the account responsive to the account specific query. The security-specific data comprises a log of security breaches identified by data platform 150 and more particularly microservices 165.

Data protection manager 154 may, as noted above, execute one or more security microservices 165 configured to analyze file system 153 protected by data platform 150 to identify the security breaches, where file system 153 is associated with the account maintained by data platform 150 for the end user. Microservices 165 may store the security breaches as entries into the log of security breaches (which form part of an account-specific knowledge base of knowledge bases 166).

UI backend 160 may process the one or more intents by, at least in part, identifying, based on the account specific intent, one or more APIs 161 that enable interactions with microservices 165. UI backend 160 may next invoke one or more of APIs 161 to retrieve the security breaches from the entries of the log of security breaches, where the data for formulating the natural language response includes the security breaches.

UI backend 160 may interface with data protection manager 154 to invoke LLM 163, which may execute LLM 163 to process the intents and the data for formulating the natural language response in order to generate the natural language response. UI backend 160 may output the natural language response to UI 176 for display to the end user.

The techniques of this disclosure may provide one or more technical advantages that realize one or more practical applications. By avoiding complicated key word searches that may require extensive understanding of the underlying security microservices, chatbot user interface 176 supported by LLM 163 executed by data platform 150 (and assisted by chatbot backend 160) may answer general security questions (e.g., "What is ransomware?") while also providing specific answers to security questions specific to underlying data platform 150 (e.g., "How do I configure security analysis for ransomware?") and specific answers relevant to the security breaches experienced by the end user account (e.g., "How many security incidents over the threshold have we experienced this year?"). By avoiding unnecessary complexity in providing this security analysis, the end user may more quickly understand and identify security breaches for an underlying file system protected by data platform 150, which may improve the user experience while also reducing an amount of computing resources (e.g., in terms of processing cycles, memory space, memory bus bandwidth, etc. along with power consumption) consumed due to the more efficient and natural response to queries that do not rely on complicated keyword searches specific to a given security microservice. The unification of multiple knowledge bases 166 via LLM 163 may also promote more comprehensive answers that require less investigation (and associated time) by the end user while also promoting a quicker understanding of the security risks to underlying file system 153 protected by data platform 150.

System 190 of FIG. 1B is a variation of system 100 of FIG. 1A in that data platform 150 stores snapshots 142 using chunkfiles 162 stored to snapshot storage system 115 that resides on premises or, in other words, local to data platform 150. In some examples of system 190, storage system 115 enables users or applications to create, modify, or delete chunkfiles 162 via file system manager 152. In system 190, storage system 105 of FIG. 1B is the local storage system used by data protection manager 154 for initially storing and accumulating chunks prior to storage at storage system 115. Data protection manager 154 may store tree data comprising nodes with references (e.g., pointers) to one or more chunks 164 at storage system 115. Though not shown, data protection manager 154 may store the tree data and checksums at storage system 105 in addition to or instead of storage system 115, regardless of whether or not storage system 115 is remote or local to data platform 150, in some examples.

Figure 2:
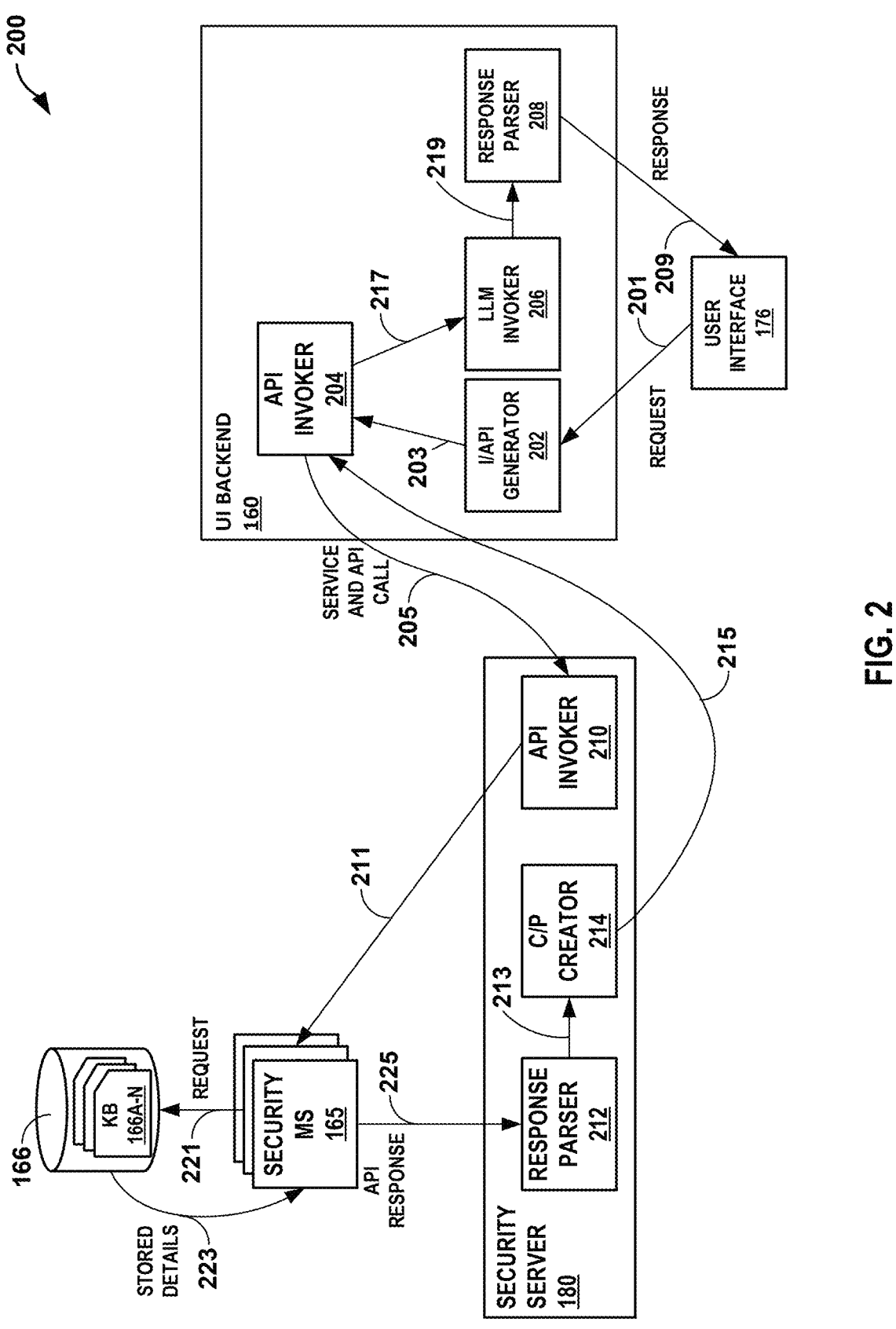
FIG. 2 is a block diagram illustrating an example computing system configured to support execution of an artificial intelligence chatbot that performs security analysis, in accordance with techniques of this disclosure.

FIG. 2 is a block diagram illustrating an example computing system configured to support execution of an artificial intelligence chatbot that performs security analysis, in accordance with techniques of this disclosure. In the example of FIG. 2, computing system 200 may represent an example of computing system 100. Computing system 200 may include a suitable hardware configuration (e.g., processing logic, memory, storage systems, network interfaces, etc.) to support execution of security microservices 165 along with other microservices (e.g., UI backend 160, etc.).

As shown in the example of FIG. 2, computing system 200 may represent an abstraction of computing system 100 in that not all aspects of computing system 100 are reflected in computing system 200. Computing system 200 may include UI backend 160 (along with user interface 176) and security server 180. UI backend 160 may represent a service or microservice executed within a control plane (CP) environment provided by data platform 150. Security server 180 may likewise represent a service or microservice executed within a service plane environment supported by data platform 150.

UI backend 160 may include an intent and API ("I/API") generator 202, an API invoker 204, an LLM invoker 206, and a response parser 208. I/API generator 202 may represent a module configured to process requests 201 to identify one or more intents and a corresponding API of APIs 161 (shown in FIGS. 1A and 1B) that may be required to satisfy the one or more intents. The indents may include keywords parsed from requests 201. I/API generator 202 may utilize the keywords to determine the category to which the query belongs, where such categories may be correlated to the different knowledge bases 166.

In some instances, I/API generator 202 may utilize a trained AI/ML model to derive, based on the keywords, an API and one or more corresponding API function calls corresponding to the appropriate microservices 165 that need to be invoked in order to satisfy the intent. The trained AI/ML model may be trained on each of APIs 161 in order to develop a relationship between the intent and each function of each of the APIs 161. I/API generator 202 may interface with API invoker 204, passing identified API(s) 161 and function call(s) as API calls 203 that should be used to interface with security microservices 165.

In other words, I/API generator 202 may operate as follows:

Query Processing and Categorization: Upon receiving a query from the user, the system garses the query to extract important keywords. These keywords are then used to determine the category to which the query belongs. The categories include general queries, data-platform-specific queries, data-platform-specific ransomware-related queries or customer account-related queries.

Handling General Queries: For general queries, the service relies on a Large Language Model (LLM) knowledge to generate an appropriate response. LLM 163 can understand and respond to a wide range of general topics without the need for specific data sources.

Handling Specific Queries: If the query pertains to information specific to data platform 150, the system may consult documents or Knowledge Base (KB) articles (represented by knowledge bases 166) to retrieve relevant data. This approach may ensure that users receive accurate and up-to-date information specific to data platform 150.

Intent and API determination: If the user's response necessitates data from an API, the first step may involve pinpointing the service responsible for making API calls. For instance, in the case of security-related queries, UI backend 160 may call security server 180 with the correct API of APIs 161. This specific software defined intelligence may rely on leveraging LLM 163. Supplying the API specification alongside descriptions may aid in locating the precise service, ensuring the correct APIs of APIs 161 are invoked.

Stated differently, various aspects of the techniques enable development of ChatBot UI 170 using LLM 163 to address queries related to security services offered by data platform 150. In some examples, chatbot UI 170 may specifically focus on security-related queries. ChatBot UI 170 may be capable of understanding and responding to a range of queries, encompassing both general questions and those specific to customer data and potential security issues.

Example tasks, expressed here using a natural language, may include the following:

"How should I respond to anomaly detection?" This is a general query that involves knowledge of both LLM 163 and in-house ransomware documentation.

"List all open ransomware anomalies that exceed the defined confidence threshold." A query specific to customer data may involve real-time calls to APIs 161 for live information retrieval.

"Show the list of affected files of a snapshot." A query requiring specific information about affected files, indicating some possible information for both historical and live data.

API invoker 204 may represent a module configured to interface with an appropriate service (which in this instance represents a security service, as opposed to other services, such as backup, archiving, cost analysis, etc.) along with the corresponding API calls 203. API invoker 204 may issue API calls 203 to the correct service, which are shown as service and API call 205 in the example of FIG. 2. API invoker 204 may be configured to associate a service with an appropriate identifying information, such as an Internet protocol (IP) address, port, domain name, etc. to establish a connection with the security service and pass the API calls 203 to the appropriate server that supports the identified service (e.g., security server 180).

LLM invoker 206 may represent a module configured to invoke LLM 163 based on one or more of a context, prompt, and session details (e.g., one or more of request 201, intents, API calls 203, keywords, and stored details extracted from knowledge bases (KB) 166A-N ("KB 166A-N"). LLM invoker 206 may receive context and prompts 215 along with session details as an LLM API call 217 and output, based on LLM API call 217, an LLM response 219 received from LLM 163. LLM invoker 206 may interface with LLM 163 (whether local or remote), passing the LLM API call 217 to LLM 163 to receive LLM response 219. LLM 206 may output LLM response 219 to response parser 208, which may represent a module configured to parse LLM response 219 in order to formulate a response 209 to request 201. Response parser 208 may output response 209 to chatbot UI 176 for presentation to the end user.

As further shown in the example of FIG. 2, security server 180 may include an API invoker 210, a response parser 212, and a command and prompt ("C/P") creator 214. API invoker 210 may represent a module configured to process service and API calls 205 and interface with security micro-services ("MS") 165 in order to invoke API calls 205 with respect to the appropriate one of security MS 165. API invoker 210 may maintain a relationship between a security microservices 165 and identifying information for communicating with each of security MS 165, which allows API invoker 210 to establish a communication session over which to issue API calls 205 to the appropriate one of security MS 165 as API calls 211.

An example of the interface between API invoker 204 and API invoker 210 is provided below.

API interface b/w API executor service (ex. server) and CP

```
openapi: 3.0.0
info:
  title: Your API
    description: Description of your API
    version: 1.0.0
paths:
/getContext:
  get:
  summary: Get context for specified API endpoints
  parameters:
    -name: APIEndpoints
      in: query
      description: List of API endpoints to execute
      required: true
      schema:
        type: array
        items:
        type: object
        properties:
        url:
        type: string
        description: URL of the API
        endpoint
        method:
        type: string
        description: HTTP method (GET, POST, etc.)
```

```
  responses:
    200:
      description: OK
      content:
        application/json:
        schema:
        $ref:
        "#/components/schemas/APIContex-
        tResponse"
    default:
      $ref: "#/components/responses/Error"
components:
  schemas:
    APIContextResponse:
      type: object
      nullable: true
      properties:
        responses:
        $ref:      "#/components/schemas/APIRespon-
        seList"
APIResponseList:
  type: array
  nullable: true
  description: Specifies the list of API responses.
  items:
    $ref: "#/components/schemas/APIResponse"
APIResponse:
  type: object
  nullable: true
  description: Specifies the DLP source params.
  required:
    endpoint
    description
    statusCode
    response
  properties:
    endpoint:
      type: string
      nullable: true
      description: URL of the API endpoint
    description:
      type: string
      nullable: true
      description: Specifies the description of the API
        endpoint
    statusCode:
      type: number
      nullable: true
      description: The response status code
    response:
      type: string
      nullable: true
      description: Specifies the Actual API response
#API error response schemas
ApiError:
  type: object
  nullable: true
  properties:
    errorCode:
      type: integer
      format: int64
      description: Specifies the error code.
      nullable: true
    message:
      type: string
      description: Specifies the error message.
      nullable: true
```

```
responses:
  Error:
    description: Error
    content:
      application/json:
        schema:
          $ref: "#/components/schemas/ApiError"
```

Responsive to receiving API calls 211, one or more of security MS 165 may issue a request 221 to one or more of knowledge bases 166. Knowledge bases 166 may return, to the one or more of security MS 165, stored details 223 (which may refer to data stored to the security logs representative of various knowledge bases 166 discussed above with respect to the example of FIG. 1A). Security MS 165 may then pass an API response 225 (that includes stored details 223) to response parser 212.

Response parser 212 may represent a unit configured to parse stored details 223 from API response 225 and condition stored details 223 (e.g., reformat, add, and/or eliminate various aspects of stored details 223) in preparation for context and prompt generation. Response parser 212 may interface with C/P creator 214 to pass conditioned stored details 223. C/P creator 214 may process conditioned stored details 223 to identify a context and a prompt ("C/P") 215. The context may identify a source of stored details 223 (which of the above noted knowledge bases 166 provided aspects of stored details 223), while the prompt may be generated to conform to best ways for formulating the input of stored details 223 to obtain a reasonable response from LLM 163. C/P creator 215 may output C/P 215 to API invoker 204 via an API response (and as such C/P 215 may also be referred to as "API response 215").

For example: if the User query seeks details about an anomaly, UI backend 160 may require information from the incidences API within a predictor security MS 165. Given the security context of the product, UI backend 160 may initiate a call to security server 180, providing incidences API details. In the background, security server 180 communicates with predictor MS 165 for incidences API 161, retrieves the response, and parses the data. Essential information is then extracted to generate context. Depending on the API type, the corresponding prompt is created.

As noted above, API invoker 204 may process API response 215 and construct an LLM API call 217 that includes C/P 215 along with various session details (e.g., request 201, intents/keywords, service, etc.). LLM invoker 206 may issue LLM API call 217 to an appropriate LLM 163 (as more than one LLM 163 may be used to formulate an LLM response 219). LLM invoker 206 may receive LLM response 219 in response to the LLM API call 217, which response parser 208 may parse to generate response 209.

The following is an example interface for interacting with user interface 176 to initiate the foregoing techniques.

```
openapi: 3.0.0
info:
  title: ChatGPT API
  description: API for interacting with security chatbot
  version: 1.0.0
paths:
  /chat:
    post:
      summary: Send a message to chat bot
      requestBody:
        required: true
        content:
          application/json:
            schema:
```

```
              type: object
              properties:
                message:
                  type: string
                  description: The
                  message to send to chat bot
      responses:
        '200':
          description: Successful response
          content:
            application/json:
              schema:
                type: object
                properties:
                  success:
``` type: boolean
description: Indicates if the request was successful
message:
type: string
description: Additional information about the response
data:
type: object
description: Model-generated response data
properties:
response:
type: string
description: Model-generated response to the input message
example:
success: true
message: "Request successful"
data:
response: "Model-generated response to the input message"

In this way, chatbot UI 176 (which is another way to refer to UI 176) may receive a request 201 (which may also be referred to as "user query 201" or "query 201") from the end user, which is forwarded or otherwise provided to UI backend 160. UI backend 160 may process user query 201 to identify one or more intent and API(s) (of APIs 161). UI backend 160 may invoke function calls with respect to the identified one or more of APIs 161 to interface with microservices 165 in order to retrieve the data for formulating a response 209. UI backend 160 may also access knowledge bases 166 either directly or via APIs 161 (which are stored to a "server"). This data is provided to LLM 163, which may utilize the data (along with the intents) to formulate a natural language response 209. LLM 163 may provide natural language response 209 to UI 176.

In other words, one potential challenge tackled by UI 176 as supported by UI backend 160 is to possibly enhance the efficiency and accuracy of responding to ransomware (and other security related services provided by microservices 165) queries related to data platform 150. An example focus is on developing a chatbot UI 176 that can handle a wide spectrum of security-related questions, from general security related inquiries to specific security issues related to customer data and potential ransomware attacks. Example tasks include answer inquiries related to "How should I respond to anomaly detection?," "List all ransomware anomalies that exceed the defined confidence threshold," and/or "Show the list of affected files of a snapshot." The chatbot may enable the end user to efficiently handle customer queries, while possibly reducing the need for immediate assistance (e.g., from customer support for data platform 150) or information regarding security (e.g., ransomware) services.

That is, data platform 150, as a comprehensive product, is replete with numerous features, which can sometimes make it challenging for customers and/or end users to quickly access the information or details they need. This often requires the end user to sift through extensive support documentation or navigate complex UI paths to extract specific event details from their accounts. In some cases, the end user might even need to reach out to support for in-depth assistance. To address these challenges, various aspects of the techniques described in this disclosure enable a ChatBot, designed as a possible one-stop solution for efficiently managing any queries related to security services provided by microservices 165. In one example, the ChatBot is focused on Data Security, and particularly adept at handling ransomware security-related queries, where this ChatBot is potentially configured to deliver intelligent, customized responses. The ChatBot may be capable of tackling a broad spectrum of queries, from general information requests to more intricate, account-specific issues. The ChatBot may not only simplify information access for end users but also significantly enhances their user experience by possibly providing immediate, relevant, and detailed assistance.

General Information Requests

Question: What is ransomware?

Answer: Ransomware is a type of malicious software that encrypts a victim's files or locks their computer, making them inaccessible. The attacker then demands a ransom payment in exchange for restoring access to the files or computer. Ransomware attacks can cause significant damage and disruption to individuals and organizations.

Account-Specific Queries

Question: You are a Cohesity ransomware chatbot and You'll be provided with details about ransomware attacks on an account. Using this data, you need to answer queries. Data about anomalies context keep response short Answer: Based on the data provided, there have been a total of 43 anomalies related to ransomware attacks on the account. The affected file counts range from 0 to 4286, and the anomaly strengths range from 65 to 90. The entity name for all the anomalies is 'dmaas-ransomware-fileext-test_DO_NOT_DELETE' or 'helios-fknox-ransomware-vm-test1_DO_NOT_DELETE'. The protection group IDs and source names are also provided for each anomaly.

Question: count of all the anomalies

Answer: The count of all the anomalies is 43.

Various aspects of the techniques may enable integration of a ChatBot UI into data platform 150, which possibly represents a significant advancement in user interaction and information retrieval. This system, leveraging CP (as represented by UI backend 160), may improve past solutions in several ways:

1. Advanced Query Processing: The ChatBot may utilize an advanced query parser to categorize user queries into general, data-platform-specific, ransomware-related, or customer account-related groups. This may enable precise and relevant responses tailored to the specific nature of each inquiry.

2. Utilization of Large Language Model (LLM) 163: For general queries, the system may utilize an LLM knowledge base, covering a wide range of topics without requiring specific data sources. This may represent a more sophisticated approach compared to traditional keyword-based search methods.

3. Data-Platform-Specific Information Retrieval: Unlike previous solutions, where users had to manually sift through documents or contact support, our ChatBot directly consults relevant documents and Knowledge Base articles (e.g., knowledge bases 166), providing accurate and up-to-date information specific to data platform products and services related to security.

4. Intent and API Determination: For queries that require live data, data platform 150 may be capable of identifying the appropriate service for API calls. Data platform 150 may use AI technology to possibly accurately locate and invoke the correct service, a feature that may not be present in past solutions.

5. Context and Prompt Generation: The ChatBot autonomously manages general information requests and specific article details in some instances. More complex queries involving API responses are handled by creating context and prompts in the CP, which may ensure a comprehensive understanding and response to the user's query.

6. Seamless Integration and Response Delivery: The final response generated is may be seamlessly conveyed to the UI ChatBot, providing users with what may appear as timely and contextually appropriate information, resulting in a potentially significant improvement over previous disjointed or manual search processes.

In this way, various aspects of the techniques provide a possible departure from traditional interactions by bringing all necessary information into a single, intelligent platform. The ChatBot eliminates the need for users to rely solely on UI navigation, data platform documents, or direct contact with data platform support staff, thereby possibly offering a more efficient, user-friendly, and comprehensive solution to query handling and information retrieval.

In the evolving data management and protection context, security stands out as an important concern for organizations. The data platform provider, which may represent a comprehensive product, is equipped with an array of features and/or services related to security, making such data platforms possibly indispensable for end users managing their data. However, the complexity of accessing pertinent information within data platform 150, coupled with the rising threat of ransomware attacks (and other security breaches), may require a dedicated focus on security.

The techniques described in this disclosure may involve addressing the possible challenge of navigating through extensive support documentation and complex UI paths by introducing a ChatBot. This ChatBot, tailored specifically for end users of data platform 150, may not only streamline access to information but is fortified with a robust security framework. Recognizing the criticality of securing sensitive data, the ChatBot may specialize in handling ransomware security-related queries. By adopting a conversational Q&A format (via natural language queries and answers), end users can effortlessly obtain customized and intelligent responses, enhancing their overall experience.

Figure 3:
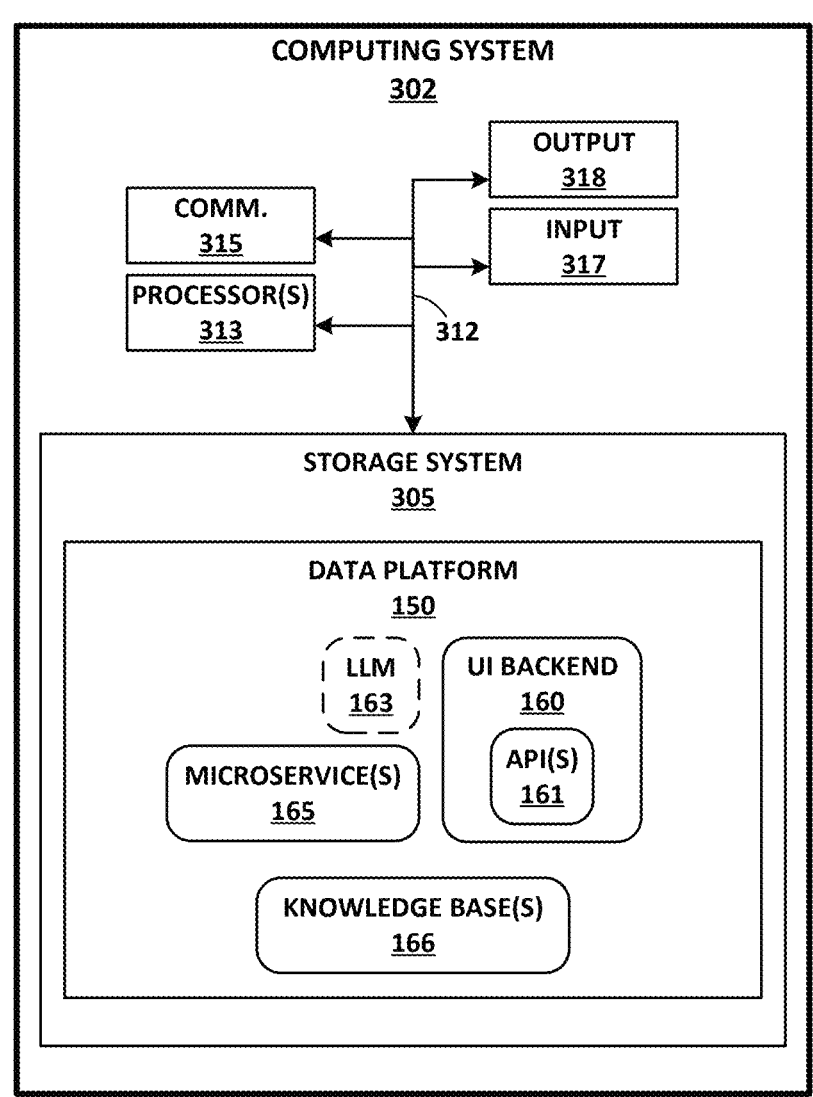
FIG. 3 is another block diagram illustrating an example computing system configured to support execution of an artificial intelligence chatbot that performs security analysis, in accordance with the techniques of this disclosure.

FIG. 3 is another block diagram illustrating an example computing system configured to support execution of an artificial intelligence chatbot that performs security analysis, in accordance with the techniques of this disclosure. Computing system 302 of FIG. 2 may represent an example of a computing device that supports execution of data platform 150 and may be described in the context of system 100 of FIG. 1A, system 190 of FIG. 1B, and/or system 200 of FIG. 2.

In the example of FIG. 3, computing system 302 may be implemented as any suitable computing system, such as one or more server computers, workstations, mainframes, appliances, cloud computing systems, and/or other computing systems that may be capable of performing operations and/or functions described in accordance with one or more aspects of the present disclosure. In some examples, computing system 302 represents a cloud computing system, server farm, and/or server cluster (or portion thereof) that provides services to other devices or systems. In other examples, computing system 302 may represent or be implemented through one or more virtualized compute instances (e.g., virtual machines, containers) of a cloud computing system, server farm, data center, and/or server cluster.

In the example of FIG. 3, computing system 302 may include one or more communication units 315, one or more input devices 317, one or more output devices 318, and one or more storage devices of local storage system 305 ("storage system 305"). One or more of the devices, modules, storage areas, or other components of computing system 302 may be interconnected to enable inter-component communications (physically, communicatively, and/or operatively). In some examples, such connectivity may be provided through communication channels (e.g., communication channels 312), which may represent one or more of a system bus, a network connection, an inter-process communication data structure, or any other method for communicating data.

One or more processors 313 of computing system 302 may implement functionality and/or execute instructions associated with computing system 302 or associated with one or more modules illustrated in FIG. 3 and described below. One or more processors 313 may be, may be part of, and/or may include processing circuitry that performs operations in accordance with one or more aspects of the present disclosure. Examples of processors 313 include microprocessors, application processors, display controllers, auxiliary processors, one or more sensor hubs, and any other hardware configured to function as a processor, a processing unit, or a processing device. Computing system 302 may use one or more processors 313 to perform operations in accordance with one or more aspects of the present disclosure using software, hardware, firmware, or a mixture of hardware, software, and firmware residing in and/or executing at computing system 302.

One or more communication units 315 of computing system 302 may communicate with devices external to computing system 302 by transmitting and/or receiving data, and may operate, in some respects, as both an input device and an output device. In some examples, communication units 315 may communicate with other devices over a network. In other examples, communication units 315 may send and/or receive radio signals on a radio network such as a cellular radio network. In other examples, communication units 315 of computing system 302 may transmit and/or receive satellite signals on a satellite network. Examples of communication units 315 include a network interface card (e.g., such as an Ethernet card), an optical transceiver, a radio frequency transceiver, a GPS receiver, or any other type of device that can send and/or receive information. Other examples of communication units 315 may include devices capable of communicating over Bluetooth®, GPS, NFC, ZigBee®, and cellular networks (e.g., 3G, 4G, 5G), and Wi-Fi® radios found in mobile devices as well as Universal Serial Bus (USB) controllers and the like. Such communications may adhere to, implement, or abide by appropriate protocols, including Transmission Control Protocol/Internet Protocol (TCP/IP), Ethernet, Bluetooth®, NFC, or other technologies or protocols.

One or more input devices 317 may represent any input device of computing system 302 not otherwise separately described herein. Input devices 317 may generate, receive, and/or process input. For example, one or more input devices 317 may generate or receive input from a network, a user input device, or any other type of device for detecting input from a human or machine.

One or more output devices 318 may represent any output devices of computing system 202 not otherwise separately described herein. Output devices 318 may generate, present, and/or process output. For example, one or more output devices 318 may generate, present, and/or process output in any form. Output devices 318 may include one or more USB interfaces, video and/or audio output interfaces, or any other type of device capable of generating tactile, audio, visual, video, electrical, or other output. Some devices may serve as both input and output devices. For example, a communication device may both send and receive data to and from other systems or devices over a network.

One or more storage devices of local storage system 305 within computing system 302 may store information for processing during operation of computing system 302, such as random access memory (RAM), Flash memory, solid-state disks (SSDs), hard disk drives (HDDs), etc. Storage devices may store program instructions and/or data associated with one or more of the modules described in accordance with one or more aspects of this disclosure. One or more processors 313 and one or more storage devices may provide an operating environment or platform for such modules, which may be implemented as software, but may in some examples include any combination of hardware, firmware, and software. One or more processors 313 may execute instructions and one or more storage devices of storage system 305 may store instructions and/or data of one or more modules. The combination of processors 313 and local storage system 305 may retrieve, store, and/or execute the instructions and/or data of one or more applications, modules, or software. Processors 313 and/or storage devices of local storage system 305 may also be operably coupled to one or more other software and/or hardware components, including, but not limited to, one or more of the components of computing system 302 and/or one or more devices or systems illustrated as being connected to computing system 302.

Storage system 305 may store data platform 150 that includes UI backend 160, LLM 163, microservices 165, and knowledge bases 166. Processors 313 may retrieve and execute one or more of UI backend 160, LLM 163, microservices 165, and knowledge bases 166. An example of the operation of computing system 302 is described in more detail with respect to FIG. 4.

Figure 4:
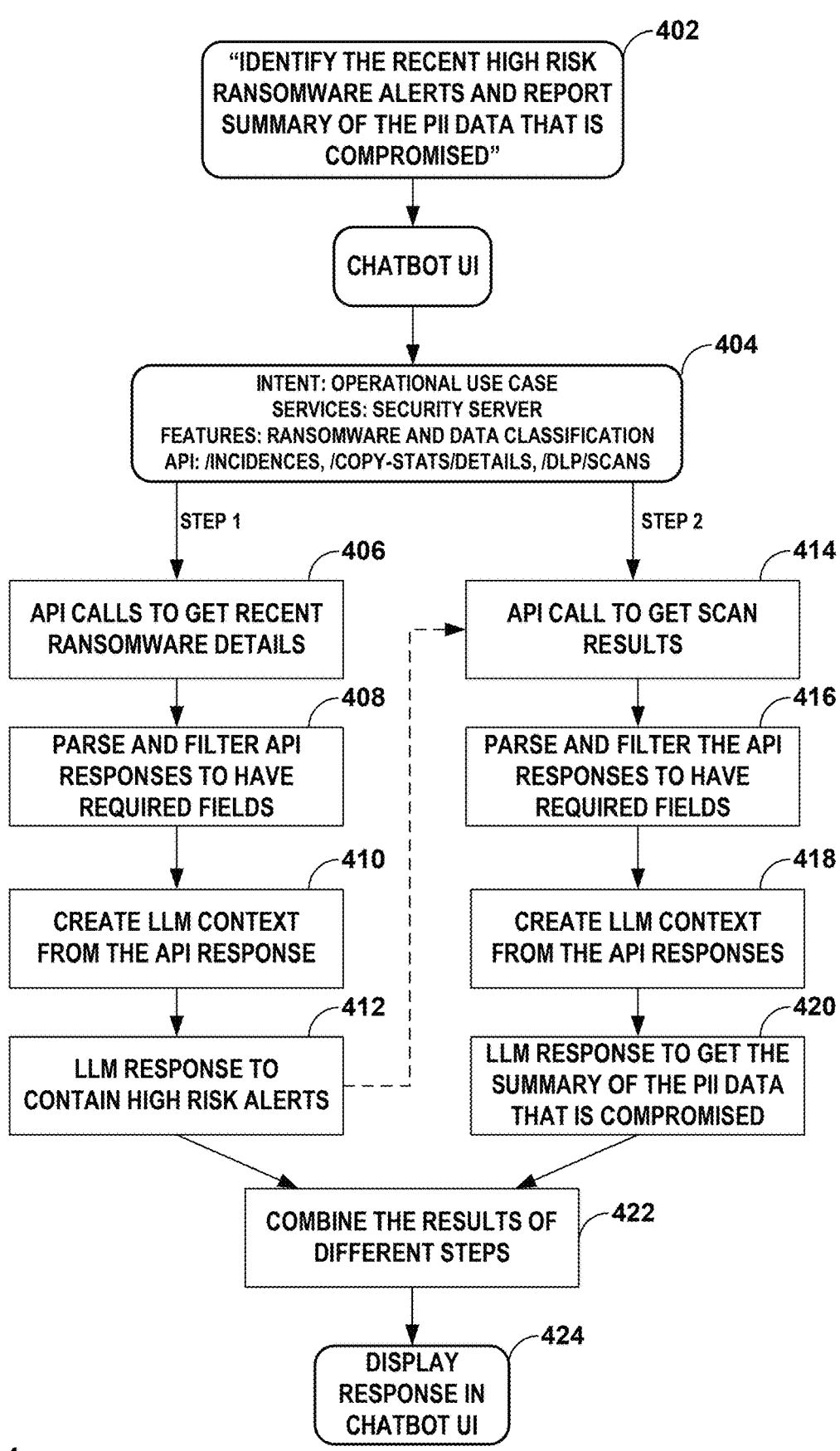
FIG. 4 is a flowchart illustrating example operation of the system shown in FIG. 3 in performing various aspects of the artificial intelligence chatbot configured to perform the security analysis techniques described in this disclosure.

FIG. 4 is a flowchart illustrating example operation of the system shown in FIG. 3 in performing various aspects of the artificial intelligence chatbot configured to perform the security analysis techniques described in this disclosure. In the example of FIG. 4, a workflow is shown that is specific to ransomware, but the techniques described in this disclosure may apply to any security related service.

In the example workflow shown in the example of FIG. 4, the query involves calling two APIs of APIs 161. While previous systems may provide only API endpoint details for a similar query, the techniques described in this disclosure may generate two different branches. The second step utilizes a response from LLM 163 in the first step, culminating in possible the amalgamation of results to deliver precise and accurate outcomes.

1. The ChatBot described in accordance with various aspects of the techniques set forth herein may excel in handling POST calls and requests that necessitate precise argument passing. For certain queries, such as dealing with ransomware to list affected files, a post-call may be required. This capability is beyond the scope of some example previous systems. Unlike these previous systems, which can only access public endpoints, the ChatBot described in accordance with various aspects of the techniques set forth herein may integrate internally with every service, and can even make calls to private APIs when required.

2. In many instances, not all services expose every API endpoint, with numerous endpoints being private. Previous systems may be limited to calling only public endpoints, whereas the ChatBot described in accordance with various aspects of the techniques set forth herein, due to its internal integration with every service, can access private APIs as needed. The direct API responses may not sufficiently address user queries as they often include extraneous details. In contrast, the ChatBot described in accordance with various aspects of the techniques set forth herein may involve parsing and massaging the response data to tailor such response data (e.g., intents and data used to formulate the response) specifically to the query. Since previous systems may refrain from interacting with the code within service internals, achieving this level of customization is beyond the capabilities of previous systems.

In other words, UI 176 may receive, as an example, a query (which is another way to refer to a request) of "Identify the recent high risk ransomware alerts and report summary of the PII [personal identification information] data that is compromised" (402). UI 176 may pass this query to UI backend 160, which may generate the following (404):

Intent: Operational use case

Services: Security services

Features: Ransomware and data classification

API:/Incidences, /Copy-Stats/Details, /DLP/Scans

UI backend 160 may then perform one or more steps as outlined above. In step 1, UI backend 160 may interface with microservices 165 via API calls to get recent ransomware details (406). UI backend 160 may parse and filter API responses to have required fields (408), create an LLM context from the API response (410), and process the LLM response that contains high risk alerts (412).

UI backend 160 may then optionally (as indicated by the dashed-line arrow) proceed to step 2. UI backend 160 may initially interface with the microservices 165 via API calls to get scan results (414). UI backend 160 may parse and filter the API responses to have the required fields (416), create the LLM context from the API responses (418), and process the LLM response to get the summary of the PII data that is compromised (420). UI backend 160 may combine the results of one or more steps to generate a response (422), and display the response in UI 176 (424).

FIG. 5 is another flowchart illustrating example operation of the system shown in FIGS. 1A-3 in performing various aspects of the artificial intelligence chatbot configured to perform the security analysis techniques described in this disclosure. Data platform 150 may invoke data protection manager 154 to perform data backups (e.g., shown as snapshots 142), which may involve invoking security microservices 165 to perform a security analysis of snapshots 142 to identify security breaches in the form of ransomware attacks, malware attacks, the presence of malicious code (e.g., a virus, a trojan horse, etc.), and the like. Microservices 165 may generate logs having entries identifying security breaches (e.g., a time of the security breach, a date of the security breach, a type of the security breach, etc.). Microservices 165 may store these logs as part of an account-specific knowledge base of knowledge bases 166. Knowledge bases 166 may also include a general security knowledge base providing general information regarding different security breaches, a security knowledge base specific to data platform 150 (e.g., defining information and/or data related to security services specific to data platform 150 and more specifically security services supported by security microservices 165), and account-specific security knowledge bases providing specific security breach information and/or data related to security breaches occurring at the particular end user (associated with application system 102 in the example of FIG. 1A).

Microservices 165 may expose application programming interfaces (APIs) 161, which UI backend 160 may invoke to query microservices 165 and obtain access to the underlying security logs having entries that identify each respective security breach. The end user may interact with UI 176, which presents a chatbot interface with which the end user may interact to input a natural language query regarding security breaches (either generally—e.g., "What is ransomware?," specifically—e.g., "How do I configure the data platform to implement ransomware detection?," and/or account-specifically—e.g., "How many security breaches above the threshold have been detected for my file system?"). Data protection manager 154 may execute or otherwise invoke UI backend 160, which obtains the query from the end user regarding security services provided by data platform 150 (500).

UI backend 160 may parse the query to identify one or more intents (502). UI backend 160 may parse the query according to extensible descriptors that configure UI backend 160 to parse intents from the query. UI backend 160 may then process the one or more intents to retrieve security data for formulating a natural language response to the query (504). UI backend 160 may interface with data protection manager 154 to invoke LLM 163, which may execute LLM 163 to process the intents and the data for formulating the natural language response in order to generate the natural language response (506). UI backend 160 may output the natural language response to UI 176 for display to the end user (508).

In this respect, various aspects of the techniques may enable the following examples.

Example 1. A method comprising: receiving, by a data platform, a query from an end user regarding security services provided by the data platform; parsing, by the data platform, the query to identify one or more intents; processing, by the data platform, the one or more intents to retrieve data for formulating a natural language response to the query; processing, by the data platform, using a large language model, the intents and the data to generate the natural language response; and outputting, by the data platform, the natural language response to a user interface for display to the end user.

Example 2. The method of claim 1, further comprising: executing one or more security microservices configured to analyze a file system protected by the data platform to identify the security breaches; storing the security breaches as entries into the log of security breaches; identifying, based on the one or more intents, one or more application programming interfaces that enable interactions with the one or more microservices; and invoking the one or more application programming interfaces to retrieve the security breaches from the entries of the log of security breaches, wherein the data for formulating the natural language response includes the security breaches.

Example 3. The method of any of examples 1 and 2, wherein the query comprises a general query regarding the security services provided by the data platform, wherein parsing the query comprises parsing the general query to identify a general intent of the general query, wherein processing the one or more intents comprises accessing a general knowledge base responsive to identifying the general intent to retrieve general data responsive to the general query, and wherein the general data relates to security of a file system protected by the data platform.

Example 4. The method of any of examples 1-3, wherein the query comprises a specific query regarding the security services provided by the data platform, wherein parsing the query comprises parsing the specific query to identify a specific intent of the specific query, wherein processing the one or more intents comprises accessing a specific knowledge base responsive to identifying the specific intent to retrieve specific data responsive to the specific query, and wherein the specific data comprises documentation for managing security provided by the data platform.

Example 5. The method of any of examples 1-4, wherein the query comprises an account specific query regarding an account maintained by the data platform for the end user, wherein parsing the query comprises parsing the account specific query to identify an account specific intent of the account specific query, and wherein processing the one or more intents comprises accessing an account specific knowledge base responsive to identifying the account specific intent to retrieve security-specific data for the account responsive to the account specific query, wherein the security-specific data comprises a log of security breaches identified by the data platform.

Example 6. The method of example 5, further comprising: executing one or more security microservices configured to analyze a file system protected by the data platform to identify the security breaches, the file system associated with the account maintained by the data platform for the end user; and storing the security breaches as entries into the log of security breaches.

Example 7. The method of example 6, wherein processing the one or more intents comprises: identifying, based on the account specific intent, one or more application programming interfaces that enable interactions with the one or more microservices; and invoking the one or more application programming interfaces to retrieve the security breaches from the entries of the log of security breaches, wherein the data for formulating the natural language response includes the security breaches.

Example 8. The method of any of examples 5-7, wherein the security breaches include one or more of a ransomware attack, a malware attack, an unauthorized data access, and a presence of malicious code.

Example 9. The method of any of examples 1-8, wherein the large language model is trained based on a general knowledge base related to general knowledge of security breaches within the data platform, a specific knowledge base comprising documentation for managing security within the data platform, and an account specific knowledge base comprising records of security breaches within a file system maintained by the data platform.

Example 10. The method of any of examples 1-9, wherein the user interface presents a chatbot user interface with which the end user interacts to enter the query as a natural language query.

Example 11. A computing system that implements a data platform, the computing system comprising: a memory configured to store a query from an end user regarding security services provided by the data platform; and processing circuitry configured to: parse the query to identify one or more intents; process the one or more intents to retrieve data for formulating a natural language response to the query; process, using a large language model, the intents and the data to generate the natural language response; and output the natural language response to a user interface for display to the end user.

Example 12. The computing system of example 11, wherein the processing circuitry is further configured to: execute one or more security microservices configured to analyze a file system protected by the data platform to identify the security breaches; store the security breaches as entries into the log of security breaches; identify, based on the one or more intents, one or more application programming interfaces that enable interactions with the one or more microservices; and invoke the one or more application programming interfaces to retrieve the security breaches from the entries of the log of security breaches, wherein the data for formulating the natural language response includes the security breaches.

Example 13. The computing system of any of examples 11 and 12, wherein the query comprises a general query regarding the security services provided by the data platform, wherein the processing circuitry is, when configured to parse the query, is configured to parse the general query to identify a general intent of the general query, wherein the processing circuitry is, when configured to process the one or more intents, configured to access a general knowledge base responsive to identifying the general intent to retrieve general data responsive to the general query, and wherein the general data relates to security of a file system protected by the data platform.

Example 14. The computing system of any of examples 11-13, wherein the query comprises a specific query regarding the security services provided by the data platform, wherein the processing circuitry is, when configured to parse the query, is configured to parse the specific query to identify a specific intent of the specific query, wherein the processing circuitry is, when configured to process the one or more intents, configured to access a specific knowledge base responsive to identifying the specific intent to retrieve specific data responsive to the specific query, and wherein the specific data comprises documentation for managing security provided by the data platform.

Example 15. The computing system of any of examples 11-14, wherein the query comprises an account specific query regarding an account maintained by the data platform for the end user, wherein the processing circuitry is, when configured to parse the query, is configured to parse the account specific query to identify an account specific intent of the account specific query, and wherein the processing circuitry is, when configured to process the one or more intents, configured to access an account specific knowledge base responsive to identifying the account specific intent to retrieve security-specific data for the account responsive to the account specific query, wherein the security-specific data comprises a log of security breaches identified by the data platform.

Example 16. The computing system of example 15, wherein the processing circuitry is configured to: execute one or more security microservices configured to analyze a file system protected by the data platform to identify the security breaches, the file system associated with the account maintained by the data platform for the end user; and store the security breaches as entries into the log of security breaches.

Example 17. The computing system of example 16, wherein the processing circuitry is, when configured to process the one or more intents, is configured to: identify, based on the account specific intent, one or more application programming interfaces that enable interactions with the one or more microservices; and invoke the one or more application programming interfaces to retrieve the security breaches from the entries of the log of security breaches, wherein the data for formulating the natural language response includes the security breaches.

Example 18. The computing system of any of examples 15-17, wherein the security breaches include one or more of a ransomware attack, a malware attack, an unauthorized data access, and a presence of malicious code.

Example 19. The computing system of any of examples 11-18, wherein the large language model is trained based on a general knowledge base related to general knowledge of security breaches within the data platform, a specific knowledge base comprising documentation for managing security within the data platform, and an account specific knowledge base comprising records of security breaches within a file system maintained by the data platform.

Example 20. Non-transitory computer-readable storage media having instructions stored thereon that, when executed, cause one or more processors to: obtain a query from an end user regarding security services provided by the data platform; parse the query to identify one or more intents; process the one or more intents to retrieve data for formulating a natural language response to the query; process, using a large language model, the intents and the data to generate the natural language response; and output the natural language response to a user interface for display to the end user.

For processes, apparatuses, and other examples or illustrations described herein, including in any flowcharts or flow diagrams, certain operations, acts, steps, or events included in any of the techniques described herein can be performed in a different sequence, may be added, merged, or left out altogether (e.g., not all described acts or events are necessary for the practice of the techniques). Moreover, in certain examples, operations, acts, steps, or events may be performed concurrently, e.g., through multi-threaded processing, interrupt processing, or multiple processors, rather than sequentially. Further certain operations, acts, steps, or events may be performed automatically even if not specifically identified as being performed automatically. Also, certain operations, acts, steps, or events described as being performed automatically may be alternatively not performed automatically, but rather, such operations, acts, steps, or events may be, in some examples, performed in response to input or another event.

The detailed description set forth herein, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

In accordance with one or more aspects of this disclosure, the term "or" may be interrupted as "and/or" where context does not dictate otherwise. Additionally, while phrases such as "one or more" or "at least one" or the like may have been used in some instances but not others; those instances where such language was not used may be interpreted to have such a meaning implied where context does not dictate otherwise.

In one or more examples, the functions described may be implemented in hardware, software, firmware, or any combination thereof. If implemented in software, the functions may be stored, as one or more instructions or code, on and/or transmitted over a computer-readable medium and executed by a hardware-based processing unit. Computer-readable media may include computer-readable storage media, which corresponds to a tangible medium such as data storage media, or communication media including any medium that facilitates transfer of a computer program from one place to another (e.g., pursuant to a communication protocol). In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can include RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the terms "processor" or "processing circuitry" as used herein may each refer to any of the foregoing structure or any other structure suitable for implementation of the techniques described. In addition, in some examples, the functionality described may be provided within dedicated hardware and/or software modules. Also, the techniques could be fully implemented in one or more circuits or logic elements.

The techniques of this disclosure may be implemented in a wide variety of devices or apparatuses, including a wireless handset, a mobile or non-mobile computing device, a wearable or non-wearable computing device, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperating hardware units, including one or more processors as described above, in conjunction with suitable software and/or firmware.

The invention claimed is:

1. A method comprising:

receiving, by a data platform, a query from an end user regarding security services provided by the data platform;

parsing, by the data platform, the query to identify one or more intents;

processing, by the data platform, the one or more intents to retrieve data for formulating a natural language response to the query;

processing, by the data platform, using a large language model, the intents and the data to generate the natural language response, wherein the large language model is trained based on a general knowledge base related to general knowledge of security breaches within the data platform, a specific knowledge base comprising documentation for managing security within the data platform, and an account-specific knowledge base comprising records of security breaches within a file system maintained by the data platform; and outputting, by the data platform, the natural language response to a user interface for display to the end user.

2. The method of claim 1, further comprising:

executing one or more security microservices configured to analyze the file system maintained by the data platform to identify the security breaches within the file system;

storing the security breaches within the file system as the records of the security breaches;

identifying, based on the one or more intents, one or more application programming interfaces that enable interactions with the one or more security microservices; and invoking the one or more application programming interfaces to retrieve the security breaches within the file system from the records of the security breaches, wherein the data for formulating the natural language response includes the security breaches within the file system.

3. The method of claim 1, wherein the query comprises a general query regarding the security services provided by the data platform, wherein parsing the query comprises parsing the general query to identify a general intent of the general query, wherein processing the one or more intents comprises accessing the general knowledge base responsive to identifying the general intent to retrieve general data responsive to the general query, and wherein the general data relates to the security of the file system maintained by the data platform.

4. The method of claim 1, wherein the query comprises a specific query regarding the security services provided by the data platform, wherein parsing the query comprises parsing the specific query to identify a specific intent of the specific query, wherein processing the one or more intents comprises accessing the specific knowledge base responsive to identifying the specific intent to retrieve specific data responsive to the specific query, and wherein the specific data comprises the documentation for managing the security within the data platform.

5. The method of claim 1, wherein the query comprises an account-specific query regarding an account maintained by the data platform for the end user, wherein parsing the query comprises parsing the account-specific query to identify an account-specific intent of the account-specific query, and wherein processing the one or more intents comprises accessing the account-specific knowledge base responsive to identifying the account-specific intent to retrieve security-specific data for the account responsive to the account-specific query, wherein the security-specific data comprises the records of the security breaches within the file system maintained by the data platform.

6. The method of claim 5, further comprising:

executing one or more security microservices configured to analyze the file system maintained by the data platform to identify the security breaches within the file system, the file system associated with the account maintained by the data platform for the end user; and storing the security breaches within the file system as the records of the security breaches within the file system maintained by the data platform.

7. The method of claim 6, wherein processing the one or more intents comprises:

identifying, based on the account-specific intent, one or more application programming interfaces that enable interactions with the one or more security microservices; and invoking the one or more application programming interfaces to retrieve the security breaches within the file system from the records of the security breaches within the file system maintained by the data platform, wherein the data for formulating the natural language response includes the security breaches within the file system.

8. The method of claim 5, wherein the security breaches within the file system maintained by the data platform include one or more of a ransomware attack, a malware attack, an unauthorized data access, and a presence of malicious code.

9. The method of claim 1, wherein the user interface presents a chatbot user interface with which the end user interacts to enter the query as a natural language query.

10. A computing system that implements a data platform, the computing system comprising:

a memory configured to store a query from an end user regarding security services provided by the data platform; and processing circuitry configured to:

parse the query to identify one or more intents;

process the one or more intents to retrieve data for formulating a natural language response to the query;

process, using a large language model, the intents and the data to generate the natural language response, wherein the large language model is trained based on a general knowledge base related to general knowledge of security breaches within the data platform, a specific knowledge base comprising documentation for managing security within the data platform, and an account-specific knowledge base comprising records of security breaches within a file system maintained by the data platform; and output the natural language response to a user interface for display to the end user.

11. The computing system of claim 10, wherein the processing circuitry is further configured to:

execute one or more security microservices configured to analyze the file system maintained by the data platform to identify the security breaches within the file system;

store the security breaches within the file system as the records of the security breaches;

identify, based on the one or more intents, one or more application programming interfaces that enable interactions with the one or more security microservices; and invoke the one or more application programming interfaces to retrieve the security breaches within the file system from the records of the security breaches, wherein the data for formulating the natural language response includes the security breaches within the file system.

12. The computing system of claim 10, wherein the query comprises a general query regarding the security services provided by the data platform, wherein the processing circuitry is, when configured to parse the query, is configured to parse the general query to identify a general intent of the general query, wherein the processing circuitry is, when configured to process the one or more intents, configured to access the general knowledge base responsive to identifying the general intent to retrieve general data responsive to the general query, and wherein the general data relates to the security of the file system maintained by the data platform.

13. The computing system of claim 10, wherein the query comprises a specific query regarding the security services provided by the data platform, wherein the processing circuitry is, when configured to parse the query, is configured to parse the specific query to identify a specific intent of the specific query, wherein the processing circuitry is, when configured to process the one or more intents, configured to access the specific knowledge base responsive to identifying the specific intent to retrieve specific data responsive to the specific query, and wherein the specific data comprises the documentation for managing the security within the data platform.

14. The computing system of claim 10, wherein the query comprises an account-specific query regarding an account maintained by the data platform for the end user, wherein the processing circuitry is, when configured to parse the query, is configured to parse the account-specific query to identify an account-specific intent of the account-specific query, and wherein the processing circuitry is, when configured to process the one or more intents, configured to access the account-specific knowledge base responsive to identifying the account-specific intent to retrieve security-specific data for the account responsive to the account-specific query, wherein the security-specific data comprises the records of the security breaches within the file system maintained by the data platform.

15. The computing system of claim 14, wherein the processing circuitry is configured to:

execute one or more security microservices configured to analyze the file system managed by the data platform to identify the security breaches within the file system, the file system associated with the account maintained by the data platform for the end user; and store the security breaches within the file system as the records of the security breaches.

16. The computing system of claim 15, wherein the processing circuitry is, when configured to process the one or more intents, is configured to:

identify, based on the account-specific intent, one or more application programming interfaces that enable interactions with the one or more security microservices; and invoke the one or more application programming interfaces to retrieve the security breaches from the records of the security breaches, wherein the data for formulating the natural language response includes the security breaches.

17. The computing system of claim 14, wherein the security breaches within the file system maintained by the data platform include one or more of a ransomware attack, a malware attack, an unauthorized data access, and a presence of malicious code.

18. Non-transitory computer-readable storage media having instructions stored thereon that, when executed, cause one or more processors to:

obtain a query from an end user regarding security services provided by a data platform;

parse the query to identify one or more intents;

process the one or more intents to retrieve data for formulating a natural language response to the query;

process, using a large language model, the intents and the data to generate the natural language response, wherein the large language model is trained based on a general knowledge base related to general knowledge of security breaches within the data platform, a specific knowledge base comprising documentation for managing security within the data platform, and an account-specific knowledge base comprising records of security breaches within a file system maintained by the data platform; and output the natural language response to a user interface for display to the end user.

* * * * *